US008478056B2

(12) United States Patent
Lee

(10) Patent No.: US 8,478,056 B2
(45) Date of Patent: Jul. 2, 2013

(54) METHOD OF AND APPARATUS FOR DETECTING ERROR IN IMAGE DATA STREAM

(75) Inventor: Jun-Young Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1111 days.

(21) Appl. No.: 11/856,343

(22) Filed: Sep. 17, 2007

(65) Prior Publication Data

US 2008/0240576 A1  Oct. 2, 2008

(30) Foreign Application Priority Data

Mar. 29, 2007  (KR) .................. 10-2007-0031136

(51) Int. Cl.
*G06K 9/36* (2006.01)
*G06K 9/46* (2006.01)

(52) U.S. Cl.
USPC ..................... 382/232; 375/240.27

(58) Field of Classification Search
None
See application file for complete search history.

(56) References Cited

U.S. PATENT DOCUMENTS

| 5,420,872 A * | 5/1995 | Hyodo et al. ............... 714/747 |
| 5,511,136 A * | 4/1996 | Kim ................................. 382/275 |
| 5,617,333 A | 4/1997 | Oyamada et al. |
| 5,699,117 A * | 12/1997 | Uramoto et al. ............ 348/390.1 |
| 5,717,705 A * | 2/1998 | Shikakura et al. ............ 714/746 |
| 6,404,817 B1 * | 6/2002 | Saha et al. ............... 375/240.27 |
| 6,721,362 B2 * | 4/2004 | Lin et al. .................. 375/240.27 |
| 6,829,299 B1 * | 12/2004 | Chujoh et al. ................. 375/240 |
| 7,606,313 B2 * | 10/2009 | Raman et al. ............ 375/240.27 |
| 7,660,473 B2 * | 2/2010 | Gormish ...................... 382/235 |
| 7,773,677 B2 * | 8/2010 | Lee ............................ 375/240.27 |
| 2002/0163971 A1 * | 11/2002 | Roth et al. ................ 375/240.27 |
| 2004/0153937 A1 * | 8/2004 | Moon ........................... 714/746 |
| 2004/0228410 A1 | 11/2004 | Ameres et al. |
| 2004/0258151 A1 * | 12/2004 | Spampinato ............. 375/240.03 |
| 2005/0089104 A1 | 4/2005 | Kim |
| 2005/0157799 A1 * | 7/2005 | Raman et al. ............ 375/240.27 |
| 2005/0163234 A1 * | 7/2005 | Taleb ............................ 375/259 |
| 2006/0256872 A1 * | 11/2006 | Esaki ....................... 375/240.27 |

FOREIGN PATENT DOCUMENTS

| KR | 1995-0016377 A | 6/1995 |
| KR | 10-0366055 B1 | 12/2002 |
| KR | 10-2003-0033123 A | 5/2003 |

(Continued)

OTHER PUBLICATIONS

Office Action dated Apr. 22, 2011 from the Korean Intellectual Property Office in counterpart Korean Application No. 10-2007-0031136.

(Continued)

*Primary Examiner* — Samir Ahmed
(74) *Attorney, Agent, or Firm* — Sughrue Mion, PLLC

(57) ABSTRACT

A method is provided for detecting an error in an image data stream in a device environment where digital image data is reproduced, especially, in a wired/wireless network such as a personal portable device. The method comprises determining whether or not an error is present in an input image data stream; determining a similarity between patterns of transform coefficients that are generated in the course of decoding the input image data stream; and detecting the starting position of the error based on the similarity determination. Accordingly, a decoder can independently detect the position of the error accurately, and the quality of an image which is replaced and restored using error concealment can be improved.

12 Claims, 6 Drawing Sheets

| | FOREIGN PATENT DOCUMENTS | | WO | 2004/064396 A1 | 7/2004 |
|----|----|----|----|----|----|
| KR | 10-2003-0065694 A | 8/2003 | | | |
| KR | 10-2004-0097519 A | 11/2004 | | | |
| KR | 10-2005-0040448 A | 5/2005 | | | |
| KR | 10-2006-0025528 A | 3/2006 | | | |
| KR | 10-2006-0079868 A | 7/2006 | | | |

OTHER PUBLICATIONS

Korean Notice of Allowance, dated Sep. 26, 2011, issued in Application No. 10-2007-0031136.

* cited by examiner

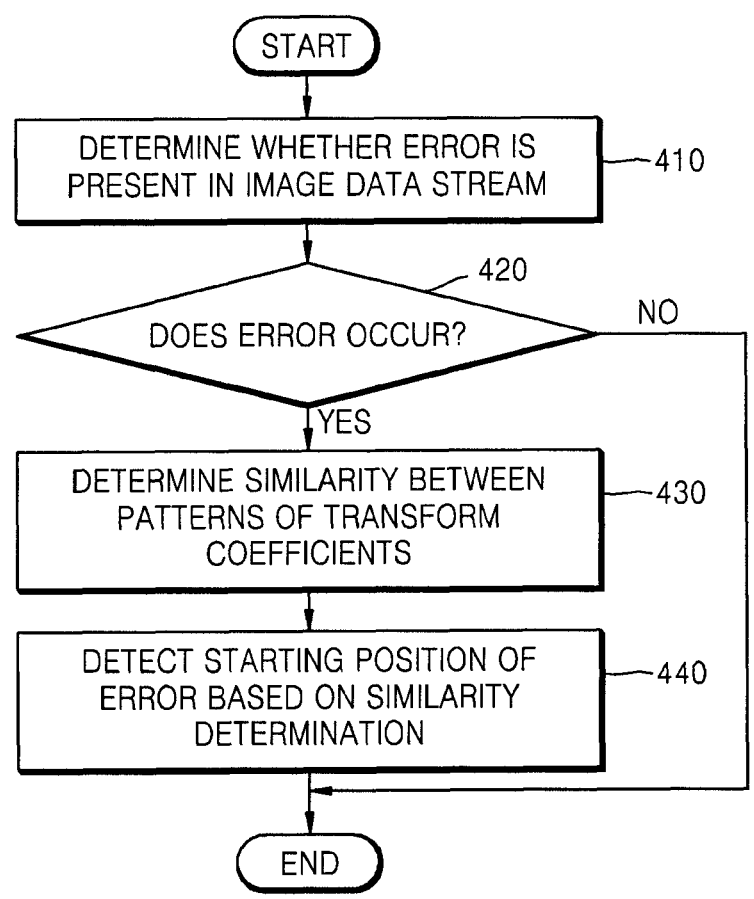

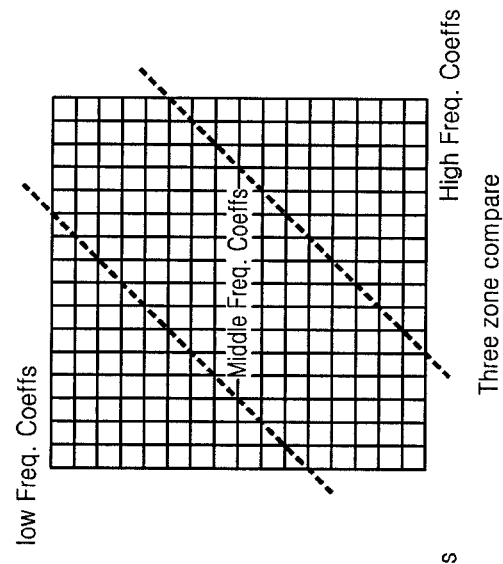
FIG. 5A
FIG. 5D
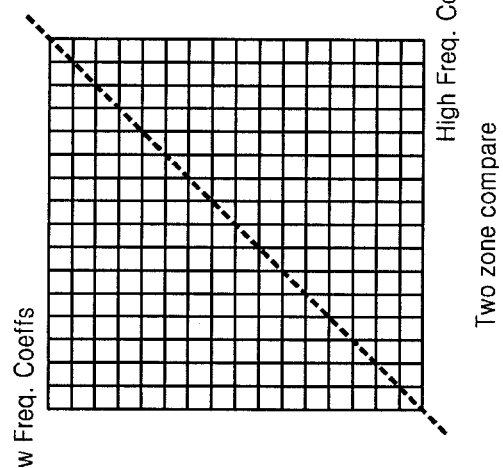
FIG. 5C
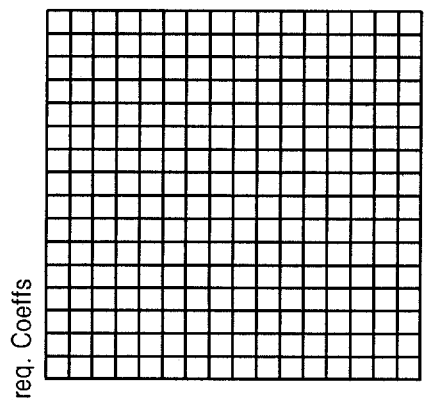
FIG. 5B

METHOD OF AND APPARATUS FOR DETECTING ERROR IN IMAGE DATA STREAM

CROSS-REFERENCE TO RELATED PATENT APPLICATIONS

This application claims the priority of Korean Patent Application No. 10-2007-0031136, filed on Mar. 29, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to detecting an error in an image data stream, and more particularly, to an apparatus for and a method of determining whether or not an error is present in an input image data stream and detecting the starting position of the error more accurately if an error is present.

2. Description of the Related Art

In a wired/wireless network environment where TVs, DVD players, devices supporting digital multimedia broadcasting (DMB), and especially, personal portable devices play digital moving pictures, communication channels for picture streaming vary according to time, and burst errors occur frequently due to poor conditions of transmission and receipt of data. For this reason, the quality of service (QoS) of and quality of experience (QoE) of moving pictures cannot be ensured.

A real-time system of streaming, in which procedures for inputs and outputs and the interaction with the surrounding environment should be performed within limited time, depends on the logical functional features and temporal features of the accuracy of the system operation. In such a system of streaming, since a receiving terminal can display moving pictures only for limited time, generally, it is hard to ensure the QoS of the moving pictures by retransmitting.

Therefore, the receiving terminal needs to determine if there are errors in the moving pictures and detect and conceal the errors.

FIG. 1 is a functional block diagram of procedures of detecting an error in a received image data stream and decoding the image data according to the conventional art.

Referring to FIG. 1, a channel decoder 110 receives image signals from an external source. An image decoding system includes a transport stream (TS) demultiplexing unit 120 that demultiplexes an image signal (TS packets), which the channel decoder 110 that is a signal receiving unit uses to extract an elementary stream (ES), and an image data decoder 130 that reproduces an image signal by decoding a reduction encoded image data stream.

The channel decoder 110 receives TS packets from the image signal of a channel chosen by a user. Channel coding and cyclic redundancy check (CRC) is performed on the received TS packets to detect errors, and in the case of a TS packet where an error occurs, a flag of a transport error indicator in a TS header of the TS packet is set to 1. In the case of a TS packet which goes missing during transmission, since the values of continuity counters of packets before and after the omitted packet are not continuous, the existence of a missing packet can also be detected.

The TS demultiplexing unit 120 includes a TS program ID (PID) filter 121 and an error detector 122. The TS PID filter 121 filters image packets using program ID information in a header of the received TS packets, and makes an ES consisting of TS image packets.

The error detector 122 inserts information about loss or damage of the packets which has been checked by the channel decoder 110 into the ES as error information in the course of producing the ES. The error information includes a predetermined bit sequence which informs of starting of the error and the number of damaged or lost TS packets to inform of the size of the error.

The image data decoder 130 includes a bit parsing unit 131, a macroblock decoder 132, and a slice decoder 133. The bit parsing unit 131 transmits bits necessary to the macroblock decoder 132 from among bit sequences of a video stream received from the TS demultiplexing unit 120. Also, during real-time decoding, the bit parsing unit 131 checks the error information that the TS demultiplexing unit 120 detected and displayed. The macroblock decoder 132 and the slice decoder 133 decode an image while performing concealment or restoring of the error on a macro basis and on a slice basis, respectively.

However, the conventional art has a problem in that it cannot be used when the transmission standard does not support CRC or the TS demultiplexing unit 120 is not able to detect an error in an elementary stream.

FIG. 2 is a diagram showing images to which error detection and error concealment methods are applied according to the conventional art.

In FIG. 2, the left drawing 210 shows an image without an error concealment (restoring) process, and the right drawing 220 shows an image which is reproduced after an error concealment process according to the conventional art. However, it is noticeable that the right drawing still has a macroblock in which an error 221 is present, and this problem occurs because the accurate starting point of the error cannot be detected during the error detection process.

According to the moving picture experts group (MPEG) standard, a decoding procedure includes variable length decoding, and during this decoding, error detection can fail if a symbol matches another symbol in a range of defined bit sequences even when the received bit sequence includes an error bit. For example, if bit sequences assigned to letters 'A', 'B', 'C', and 'D' are 00, 01, 10, and 11, respectively, when the bit sequence of 00 is received wrongly instead of the bit sequence of 01 (=B), a decoder in a receipt side continues decoding, while recognizing the bit sequence of 00(=A), since the symbol 'A' corresponding to the wrong bit sequence, that is, 00 is still present in a range of the defined bit sequences. As such, this method (range check method) cannot detect the actual position of occurrence of an error, and can cause repetition of errors which may be determined as errors at incorrect locations afterwards, and thus the determination of accurate error detection points cannot be ensured.

SUMMARY OF THE INVENTION

The present invention provides a method of and an apparatus for detecting an error in an image data stream, which determine if there is an error present in the image data stream, and allow a decoder to detect an accurate error position by detecting the starting position of the error if an error is present.

According to an aspect of the present invention, a method is provided for detecting an error in an image data stream, the method comprising: determining whether or not an error is present in an input image data stream; determining similarity between patterns of transform coefficients that are generated in the course of decoding the input image data stream; and detecting the starting position of the error based on the similarity determination.

Determining the similarity between the patterns of transform coefficients may include determining a spatial similarity between patterns of transform coefficients of adjacent macroblocks and a current macroblock in a current image frame of the input image data stream, or determining a temporal similarity between patterns of transform coefficients of a current macroblock of the current image frame and a macroblock which corresponds to the current macroblock and belongs to a reference frame which the current image frame refers to.

In the determination of the similarity between the patterns of transform coefficients, the pattern of transform coefficients may be divided into one or more areas to determine the spatial or temporal similarity of the patterns.

In the determination of the similarity between the patterns of transform coefficients, the difference between transform coefficients which have non-zero values may be compared to a predetermined threshold value.

In the determination of the similarity between the patterns of transform coefficients, a weighted value may be applied to each divided area, a value obtained after applying the weighted value may be compared to the threshold value, and the transform coefficients may be discrete cosine transform coefficients.

According to another aspect of the present invention, an apparatus is provided for detecting an error in an image data stream, the apparatus comprising: an error determination unit which determines whether or not an error is present in an input image data stream; and an error detection unit which detects the starting position of an error if it is determined that an error is present, wherein the error detection unit includes a pattern determination unit which determines a similarity between patterns of transform coefficients, which are generated in the course of decoding the input image data stream, when an error occurs.

The pattern determination unit may determine a spatial similarity between patterns of transform coefficients of adjacent macroblocks and a current macroblock in a current image frame of the input image data stream, or a temporal similarity between patterns of transform coefficients of a current macroblock of the current image frame and a macroblock which corresponds to the current macroblock and belongs to a reference frame which the current image frame refers to.

The pattern determination unit may divide each pattern of transform coefficients into one or more areas to determine the spatial or temporal similarity of the patterns.

The pattern determination unit may compare the difference between the transform coefficients which have non-zero values to a predetermined threshold value to determine the similarity, and may apply a weighted value to each divided area and compare a value obtained after applying the weighted value to the threshold value.

The apparatus may further comprise a pattern analyzing unit which reads the pattern of transform coefficients of a macroblock in the current image frame and stores the read pattern of transform coefficients to determine the spatial or temporal similarity of the patterns.

According to yet another embodiment of the present invention, an image data decoder is provided which employs therein an error detection apparatus.

According to still another embodiment of the present invention, a computer readable recording medium is provided, having embodied thereon a computer program for executing an error detection method.

BRIEF DESCRIPTION OF THE DRAWINGS

The above and other aspects of the present invention will become more apparent through a detailed description of exemplary embodiments thereof with reference to the attached drawings in which:

FIG. 4 is a flowchart for explaining in detail the method of detecting an error in the image data stream shown in FIG. 3, according to an exemplary embodiment of the present invention;

FIGS. 5A-5D show drawings for explaining the spatial similarity determination in the course of detecting an error in an image data stream according to an exemplary embodiment of the present invention;

DETAILED DESCRIPTION OF THE INVENTION

Figure 1:
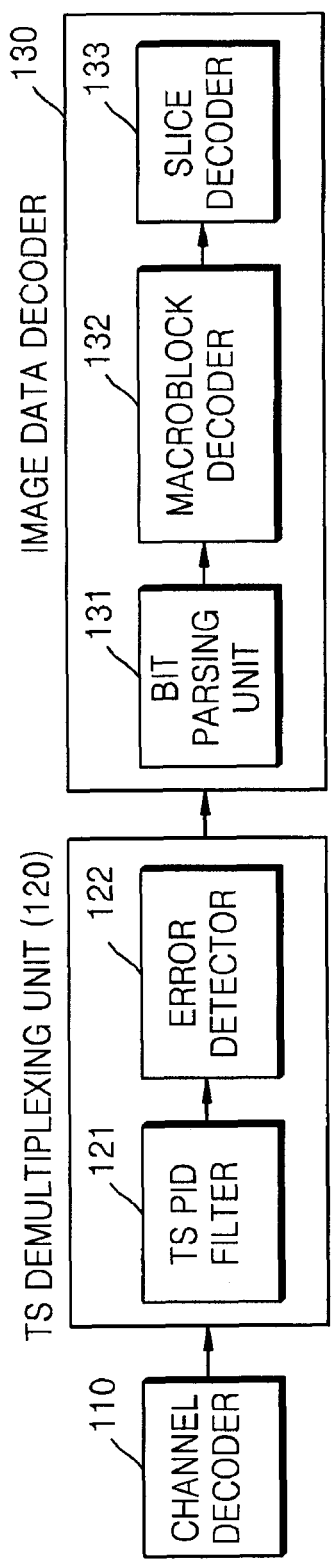
FIG. 1 is a functional block diagram of procedures of detecting an error in a received image data stream and decoding the image data according to the conventional art.
Figure 2:
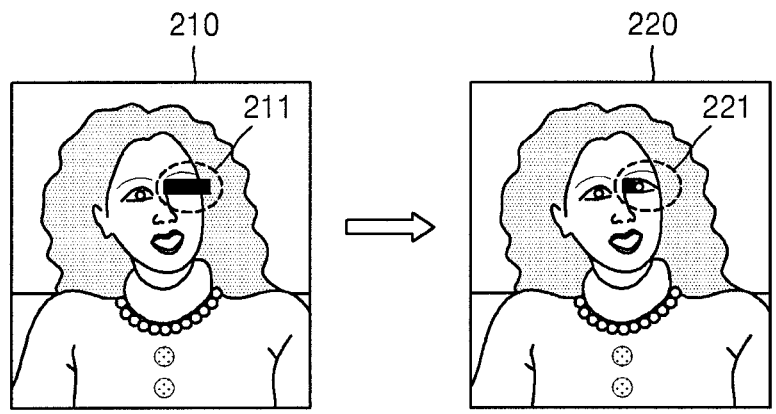
FIG. 2 shows drawings depicting images to which error detection and error concealment methods are applied according to the conventional art.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements. In other instances, the detailed description of well-known features is omitted or simplified when being considered to obscure the present invention.

Figure 3:
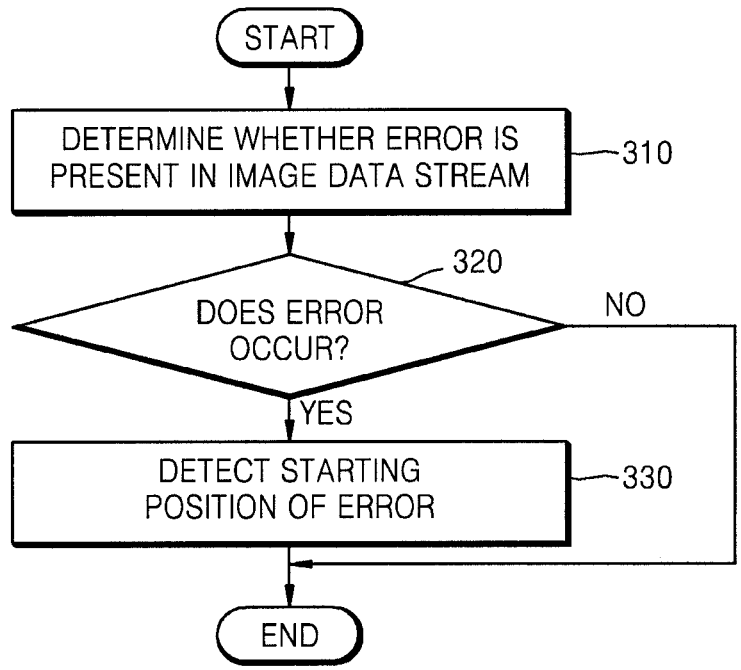
FIG. 3 is a flowchart of a method of detecting an error in an image data stream according to an exemplary embodiment of the present invention.

FIG. 3 is a flowchart of a method of detecting an error in an image data stream according to an embodiment of the present invention.

Referring to FIG. 3, the method includes the main operations of, determining whether an error is present in an input image data stream (310); and according to the result of the determining (320), detecting a starting point of the error (330) if an error occurs.

The error occurrence may be determined by performing a range check to check corresponding symbols, but this determination result may be for errors that have occurred previously due to the characteristics of variable length coding. That is, once a received bit sequence corresponds to any symbol in a range of defined symbols, even when the received bit sequence is different from the original bit sequence, the error would not be detected immediately. Therefore, the error detection might be performed at the next bit sequence not corresponding to any symbol in the range of defined symbols, and thus an error is detected not for the symbol where the error actually occurs, but for the next symbol.

Therefore, the error detection method cannot accurately detect an error occurrence position which is necessary to restore or conceal an error, and even though an image is reproduced through the concealment or restoring process, the quality of service (QoS) of the image is not satisfactory. Thus, when an error occurs, the detection of an accurate starting position of the error is required.

FIG. 4 is a flowchart for explaining in detail the method of detecting an error in the image data stream shown in FIG. 3.

Referring to FIG. 4, detailed procedures for detecting the error are described if an error occurs (420), after it is determined whether an error is present in the input image data stream (410).

In operation 430, it is determined whether patterns of transform coefficients generated during the decoding of the input image data stream are similar to one another when it is determined that an error occurs (420). In other words, the similarity between the patterns of the transform coefficients is determined using the transform coefficients generated during the decoding of the input image data stream. The transform coefficients, which are coefficients of several frequency components ranging from direct current (DC) components to high-frequency components, show a definite pattern in which the transform coefficients are concentrated towards a low-frequency energy, the transform coefficients being generated on a 16×16 basis for each macroblock in the case of the discrete cosine transform, because this transform is performed on a macroblock basis. Thus, in a macroblock where an error occurs, the transform coefficients show an abnormal pattern, and more accurate error detection can be performed by determining if the patterns are similar spatially or temporally to one another, which will be described later.

The similarity determination may be performed on the entire macroblock, or performed on a plurality of sections into which the macroblock is divided.

As an example of the similarity determination, the pattern of the transform coefficients may be divided into sections, and according to the difference in the number of the transform coefficients which have a non-zero value in each section, the similarity of the patterns can be determined. This similarity determination will be described in detail from the point of view of space or time with reference to FIGS. 5A-5D and 6A-6D.

The pattern similarity determination in each section can be performed by comparing a threshold value with the sum of weighted values which are set as experimental values in each section.

In operation 440, the starting position of the error is detected based on the determination of the similarity between patterns of the transform coefficients. Specifically, by comparing a value obtained by the similarity determination with a predetermined threshold value that is determined as an experimental value, a corresponding macroblock can be determined as the starting position of the error when the value is greater than the threshold value.

FIGS. 5A-5D show drawings for explaining the spatial similarity determination in the course of detecting an error in an image data stream according to an embodiment of the present invention.

Referring to FIGS. 5A-5D, a spatial pattern similarity between a macroblock and surrounding macroblocks in a current image frame can be determined. In FIG. 5A, the current macroblock "current MB" and the surrounding macroblocks "previous MB-A", "previous MB-B", and "previous MB-C" which have been already decoded in the same frame (or slice) are shown.

To improve the reliability of error detection based on the spatial repetition that forms a screen, the similarity between the patterns of the transform coefficients of surrounding macroblocks adjacent to the current macroblock in the same screen is determined.

Before the pattern similarity determination, the macroblock may be divided into a predetermined number of areas as shown in FIGS. 5B, 5C and 5D, and this is because the characteristics of the common pattern shown in each area differ from each other even in the same macroblock. By dividing the macroblock into a plurality of areas, the accuracy of the determination can be enhanced.

More specifically, in FIG. 5B, the transform coefficients are compared with each other in a single zone, and the comparison method is as follows:

(i) "Curr", the number of transform coefficients which have a non-zero value in the current macroblock, is obtained, (ii) "Prev", the average value of the numbers of transform coefficients which have a non-zero value in the previous macroblocks "previous MB-A", "previous MB-B", and "previous MB-C", is obtained, and (iii) When the value of (Curr−Prev) is greater than a threshold value, the current macroblock may be considered as the starting position of the error occurrence. The threshold value is obtained by experiment, and can be appropriately selected according to the reliability necessary for the error detection.

Therefore, if the error occurrence is detected by the range check method thereafter in the course of the decoding process, in regard to the position where the error actually occurs in the current image frame, it can be determined that the corresponding error occurrence time is the point of time determined in the above process (iii).

In FIG. 5C in which the macroblock is divided into two zones, the comparison method is as follows. In FIG. 5C, the left upper corner is a low-frequency area, and the right lower corner is a high-frequency area.

(i) "Curr_low", the number of transform coefficients which have a non-zero value in the low-frequency area of the current macroblock, is obtained, (ii) "Prev_low", the average value of the numbers of transform coefficients which have a non-zero value in the low-frequency area of the previous macroblocks "previous MB-A", "previous MB-B", and "previous MB-C", is obtained, (iii) "Curr_high", the number of transform coefficients in the high-frequency area of the current macroblock, is obtained, (iv) "Prev_high", the average value of the numbers of transform coefficients which have a non-zero value in the high-frequency area of the previous macroblocks "previous MB-A", "previous MB-B", and "previous MB-C", is obtained, and (v) if the value of $\{w1\times(Curr\_low-Prev\_low)\}+\{w2\times(Curr\_high-Prev\_high)\}$ is greater than a threshold, it can be determined that the current macroblock is the starting position of the error occurrence.

In the process (v), w1 and w2 are weighted variables which are determined through an experiment; for example, the values of w1 and w2 may be w1=0.3, and w2=0.7. The values of the weighted variables should be decided appropriately according to the distribution pattern of the transform coefficients after a transform algorithm is applied, for example, a discrete cosine transform (DCT).

In FIG. 5D in which the macroblock is divided into three zones, the left upper corner is a low-frequency area, the middle zone is a middle-frequency area, and the right lower corner is a high-frequency area. The comparison method is as follows:

(i) "Curr_low", the number of transform coefficients which have a non-zero value in the low-frequency area of the current macroblock, is obtained, (ii) "Prev_low", the average value of the numbers of transform coefficients which have a non-zero value in the low-frequency area of the previous macroblocks "previous MB-A", "previous MB-B", and "previous MB-C", is obtained, (iii) "Curr_mid", the number of transform coefficients which have a non-zero value in the middle-frequency area of the current macroblock, is obtained, (iv) "Prev_mid", the average value of the numbers of transform coefficients which have a non-zero value in the middle-frequency area of the previous macroblocks "previous MB-A", "previous MB-B", and "previous MB-C", is obtained, (v) "Curr_high", the number of transform coefficients in the high-frequency area of the current macroblock, is obtained, (vi) "Prev_high", the average value of the numbers of transform coefficients which have a non-zero value in the high-frequency area of the previous macroblocks "previous MB-A", "previous MB-B", and "previous MB-C" is obtained, and (vii) if the value of $\{w1 \times (Curr\_low - Prev\_low)\} + \{w2 \times (Curr\_mid - Prev\_mid)\} + \{w3 \times (Curr\_high - Prev\_high)\}$ is greater than a threshold, it can be determined that the current macroblock is the starting position of the error occurrence.

Like FIG. 5C, in the process (vii), w1, w2, and w3 are weighted variables which are determined through experiment; for example, the values of w1, w2, and w3 may be w1=0.1, w2=0.3, and w3=0.6.

FIGS. 6A-6D show drawings for explaining the temporal similarity determination in the course of detecting an error in an image data stream according to an embodiment of the present invention.

Figure 6A:
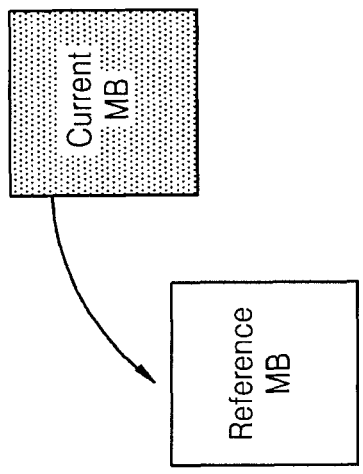
FIGS. 6A-6D show drawings for explaining the temporal similarity determination in the course of detecting an error in an image data stream according to an exemplary embodiment of the present invention.

Referring to FIGS. 6A-6D, the temporal similarity can be determined between a current macroblock and a corresponding macroblock in a reference frame which a current image frame refers to. FIG. 6A shows a reference macroblock "reference MB" which the current macroblock "current MB" refers to.

To improve the reliability of error detection in image data sequences, which are input time-sequentially, based on the temporal repetition which forms a screen, the similarity of patterns of transform coefficients is determined from the reference macroblock which the current macroblock that is predictively coded refers to.

Figure 6D:
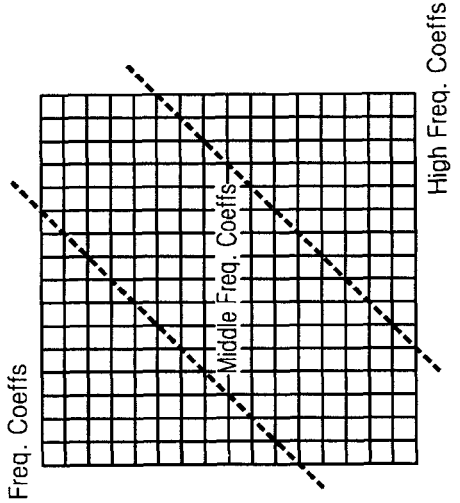
Figure 6C:
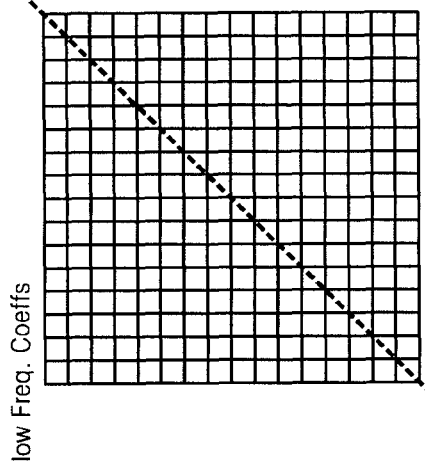
Figure 6B:
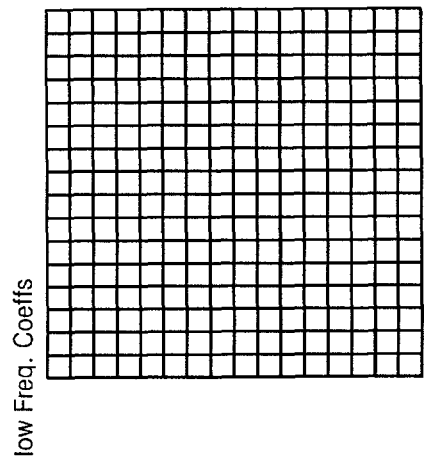

Like in FIGS. 5A-5D, the macroblock can be divided into a predetermined number of zones as shown in FIGS. 6B, 6C and 6D, which can enhance the accuracy of the determination, because characteristics of the common patterns differ from each other according to frequency in the same macroblock.

In FIG. 6B, the macroblock is a single zone, and the comparison method is as follows:

(i) "Curr", the number of transform coefficients which have a non-zero value in the current macroblock, is obtained, (ii) "Prev", the number of transform coefficients which have a non-zero value in the reference macroblocks, is obtained, and (iii) if the value of (Curr−Prev) is greater than a threshold, it can be considered that the current macroblock is the starting position of the error occurrence.

Therefore, if the error occurrence is detected by the range check method thereafter in the course of the decoding process, in regard to the position where the error actually occurs in the current image frame, it can be determined that the corresponding error occurrence time is the point of time determined in the above process (iii).

In FIG. 6C in which the macroblock is divided into two zones, wherein the left upper corner is a low-frequency area and the right lower corner is a high-frequency area, the comparison method is as follows;

(i) "Curr_low", the number of transform coefficients which have a non-zero value in the low-frequency area of the current macroblock, is obtained, (ii) "Prev_low", the average value of the numbers of transform coefficients which have a non-zero value in the low-frequency area of the reference macroblocks, is obtained, (iii) "Curr_high", the number of transform coefficients in the high-frequency area of the current macroblock, is obtained, (iv) "Prev_high" the average value of the numbers of transform coefficients which have a non-zero value in the high-frequency area of the reference macroblocks, is obtained, and (v) if a value of $\{w1 \times (Curr\_low - Prev\_low)\} + \{w2 \times (Curr\_high - Prev\_high)\}$ is greater than a threshold, it can be determined that the current macroblock is the starting position of the error occurrence.

The variables w1 and w2 are weighted variables which are determined through experiment; for example, the values of w1 and w2 may be w1=0.3, and w2=0.7.

In FIG. 6D the macroblock is divided into three zones, wherein the left upper corner is a low-frequency area, the middle zone is a middle-frequency area, and the right lower corner is a high-frequency area. The comparison method is as follows:

(i) "Curr_low", the number of transform coefficients which have a non-zero value in the low-frequency area of the current macroblock, is obtained, (ii) "Prev_low" the average value of the number of transform coefficients which have a non-zero value in the low-frequency area of the reference macroblocks, is obtained, (iii) "Curr_mid" the number of transform coefficients which have a non-zero value in the middle-frequency area of the current macroblock, is obtained, (iv) "Prev_mid", the average value of the number of transform coefficients which have a non-zero value in the middle-frequency area of the reference macroblocks, is obtained, (v) "Curr_high", the number of transform coefficients in the high-frequency area of the current macroblock, is obtained, (vi) "Prev_high", the average value of the number of transform coefficients which have a non-zero value in the high-frequency area of the reference macroblocks, is obtained, and (vii) if the value of $\{w1 \times (Curr\_low - Prev\_low)\} + \{w2 \times (Curr\_mid - Prev\_mid)\} + \{w3 \times (Curr\_high - Prev\_high)\}$ is greater than a threshold, it can be determined that the current macroblock is the starting position of the error occurrence.

Likewise, w1, w2, and w3 are weighted variables which are determined through experiment; for example, the values of w1, w2, and w3 may be w1=0.1, w2=0.3, and w3=0.6.

Figure 7:
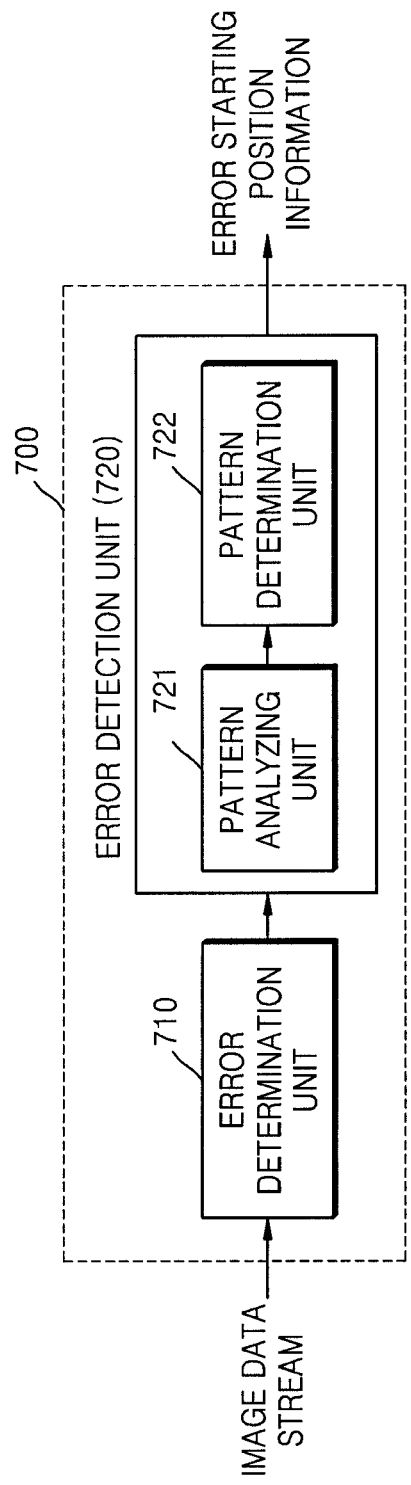
FIG. 7 is a functional block diagram of an apparatus for detecting an error in an image data stream according to an exemplary embodiment of the present invention.

FIG. 7 is a functional block diagram of an apparatus 700 for detecting an error in an image data stream according to an embodiment of the present invention.

Referring to FIG. 7, the error detection apparatus 700 includes mainly an error determination unit 710 which determines whether an error is present in an input image data stream, and an error detection unit 720 which detects the starting position of an error if it is determined that an error occurs.

The error detection unit 720 includes a pattern determination unit 722 which determines similarity between patterns of transform coefficients, which are generated in the course of decoding of the input image data stream, if the error occurs. Moreover, the error detection unit 720 may further include a pattern analyzing unit 721 which reads the patterns of transform coefficients of a macroblock in a current image frame and stores the read patterns of transform coefficients in order to determine the spatial or temporal similarity between patterns.

As such, the error detection apparatus 700 may be employed in an image decoder, and may further include a storage medium, such as external DDR memory that stores transform coefficients of previous macroblocks, a syntax parser, or a macroblock/slice decoder.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion.

As described above, according to the present invention, a method of and an apparatus for detecting an error in an image data stream allow a decoder to independently detect an accurate position of the error, and improve the quality of an image which is replaced and restored using an error concealment method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of detecting an error in an image data stream, the method comprising:
  determining whether an error is present in an input image data stream;
  determining a similarity between patterns of values of transform coefficients of different blocks having a predetermined size, the transform coefficients being generated in a course of decoding the input image data stream; and
  detecting, by an apparatus for detecting an error, a starting position of an error in the input image data stream based on the determined similarity,
  wherein the patterns correspond to the different blocks of the input image data stream,
  the predetermined size of blocks is a macroblock, and
  the determining the similarity between the patterns of transform coefficients comprises at least one of:
    determining a spatial similarity between patterns of transform coefficients of adjacent macroblocks and a current macroblock in a current image frame of the input image data stream; and
    determining a temporal similarity between patterns of transform coefficients of a current macroblock of the current image frame and a macroblock which corresponds to the current macroblock and belongs to a reference frame to which the current image frame refers.

2. The method of claim 1, wherein:
  the determining the similarity between the patterns of transform coefficients further comprises dividing each pattern of transform coefficients into one or more areas to determine the spatial or temporal similarity of the patterns of transform coefficients.

3. The method of claim 2, wherein:
  the determining the similarity between the patterns of transform coefficients further comprises comparing at least one count difference between values indicating numbers of transform coefficients which have non-zero values in at least one of the one or more areas, to a predetermined threshold value to determine the similarity.

4. The method of claim 3, wherein in the determining of the similarity between the patterns of transform coefficients, a weight is applied to each of the one or more areas and resulting weighted values are combined to obtain a value which is compared to the predetermined threshold value.

5. The method of claim 4, wherein the transform coefficients are discrete cosine transform coefficients.

6. An apparatus for detecting an error in an image data stream, the apparatus comprising:
  an error determination unit which determines whether or not an error is present in an input image data stream; and
  an error detection unit which detects a starting position of an error if it is determined that the error is present,
  wherein the error detection unit comprises a pattern determination unit which determines a similarity between patterns of values of transform coefficients of different blocks having a predetermined size, which are generated in a course of decoding the input image data stream, when the error occurs, and
  wherein the patterns correspond to the different blocks of the input image data stream
  the predetermined size of blocks is a macroblock, and
  the pattern determination unit determines at least one of:
    a spatial similarity between patterns of transform coefficients of adjacent macroblocks and a current macroblock in a current image frame of the input image data stream, and
    a temporal similarity between patterns of transform coefficients of a current macroblock of the current image frame and a macroblock which corresponds to the current macroblock and belongs to a reference frame to which the current image frame refers.

7. The apparatus of claim 6, wherein the pattern determination unit divides each pattern of transform coefficients into one or more areas to determine the spatial or temporal similarity of the patterns of transform coefficients.

8. The apparatus of claim 7, wherein the pattern determination unit compares at least one count difference between values indicating numbers of transform coefficients which have non-zero values, to a predetermined threshold value to determine the similarity.

9. The apparatus of claim 8, wherein the pattern determination unit applies a weight to each divided area and the resulting weighted values are combined to obtain a value which is compared to the predetermined threshold value.

10. The apparatus of claim 9, further comprising:
a pattern analyzing unit which reads the pattern of transform coefficients of a macroblock in the current image frame and stores the read pattern of transform coefficients to determine the spatial or temporal similarity of the patterns of transform coefficients.

11. A tangible computer readable recording medium having embodied thereon computer executable instructions for executing the error detection method comprising:
determining whether an error is present in an input image data stream;
determining a similarity between patterns of values of transform coefficients of different blocks having a predetermined size, the transform coefficients being generated in a course of decoding the input image data stream; and
detecting a starting position of an error in the input image data stream based on the determined similarity,
wherein the patterns correspond to the different blocks of the input image data stream,
the predetermined size of blocks is a macroblock, and
the determining the similarity between the patterns of transform coefficients comprises at least one of:
determining a spatial similarity between patterns of transform coefficients of adjacent macroblocks and a current macroblock in a current image frame of the input image data stream; and
determining a temporal similarity between patterns of transform coefficients of a current macroblock of the current image frame and a macroblock which corresponds to the current macroblock and belongs to a reference frame to which the current image frame refers.

12. An image data decoder having employed therein an error detection apparatus comprising:
an error determination unit which determines whether or not an error is present in an input image data stream; and
an error detection unit which detects a starting position of an error if it is determined that the error is present,
wherein the error detection unit comprises a pattern determination unit which determines a similarity between patterns of values of transform coefficients of different blocks having a predetermined size, which are generated in a course of decoding the input image data stream, when the error occurs,
wherein the patterns correspond to the different blocks of the input image data stream,
the predetermined size of blocks is a macroblock, and
the pattern determination unit determines at least one of:
a spatial similarity between patterns of transform coefficients of adjacent macroblocks and a current macroblock in a current image frame of the input image data stream, and
a temporal similarity between patterns of transform coefficients of a current macroblock of the current image frame and a macroblock which corresponds to the current macroblock and belongs to a reference frame to which the current image frame refers.

* * * * *